United States Patent

Ninomiya

[15] 3,638,772
[45] Feb. 1, 1972

[54] MEANS FOR PREVENTING REVERSE DRIVE THROUGH A HYDROSTATIC TRANSMISSION

[72] Inventor: Kenji Ninomiya, Kawasaki-shi, Japan
[73] Assignee: Kabushiki Kaisha Komatsu Seisakusho (Komatsu Ltd.), Akasaka, Tokyo, Japan
[22] Filed: Nov. 6, 1969
[21] Appl. No.: 874,644

[30] Foreign Application Priority Data
  Dec. 27, 1968 Japan.................................43/95521
  Dec. 27, 1968 Japan.................................43/95522

[52] U.S. Cl..................................192/4 B, 192/8, 192/3.57, 192/3.58, 60/53 A, 188/370
[51] Int. Cl. ................F16d 67/00, B60k 29/00, B60k 21/00
[58] Field of Search ........................192/4 B, 8, 3.34; 60/53 A

[56] References Cited

UNITED STATES PATENTS

| | | | |
|---|---|---|---|
| 2,073,357 | 3/1937 | Wemp | 192/3.34 X |
| 2,885,043 | 5/1959 | Martinson | 192/8 X |
| 2,925,157 | 2/1960 | Davis | 192/8 |
| 2,945,572 | 7/1960 | Rye | 192/8 |
| 2,500,321 | 3/1950 | Peterson | 192/8 X |
| 3,390,523 | 7/1968 | Heidemann et al. | 60/53 A |
| 3,507,371 | 4/1970 | Richards et al. | 192/3.34 X |

Primary Examiner—Benjamin W. Wyche
Attorney—Steinberg & Blake

[57] ABSTRACT

A means for automatically preventing a motor, which is hydraulically driven by a pump and mechanically drives an inertial load from a pumping action of the motor caused by being driven by said inertial load, comprising blocking a reverse power transmission. The blocking may be done by brake disc fixed to a transmission shaft or by declutching a pair of clutching members arranged across the shaft. The automatic actuation of the blocking action may be either mechanically or electrically effected.

3 Claims, 4 Drawing Figures

3,638,772

INVENTOR.
KENJI NINOMIYA
BY Steinberg & Blake
Attys

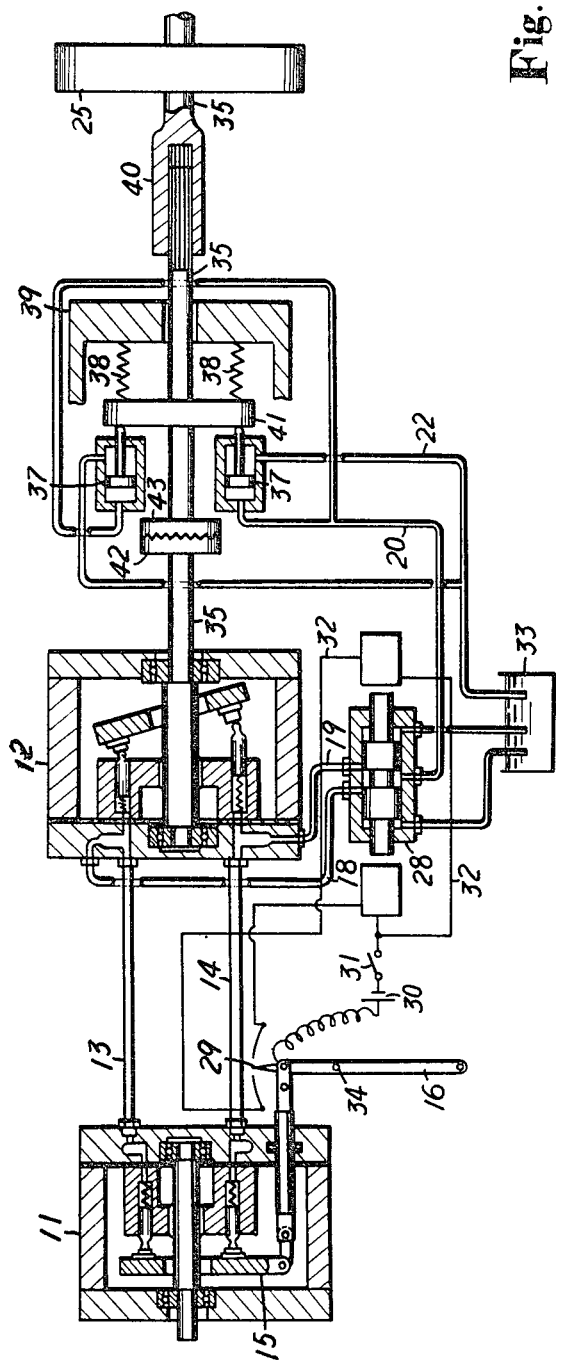
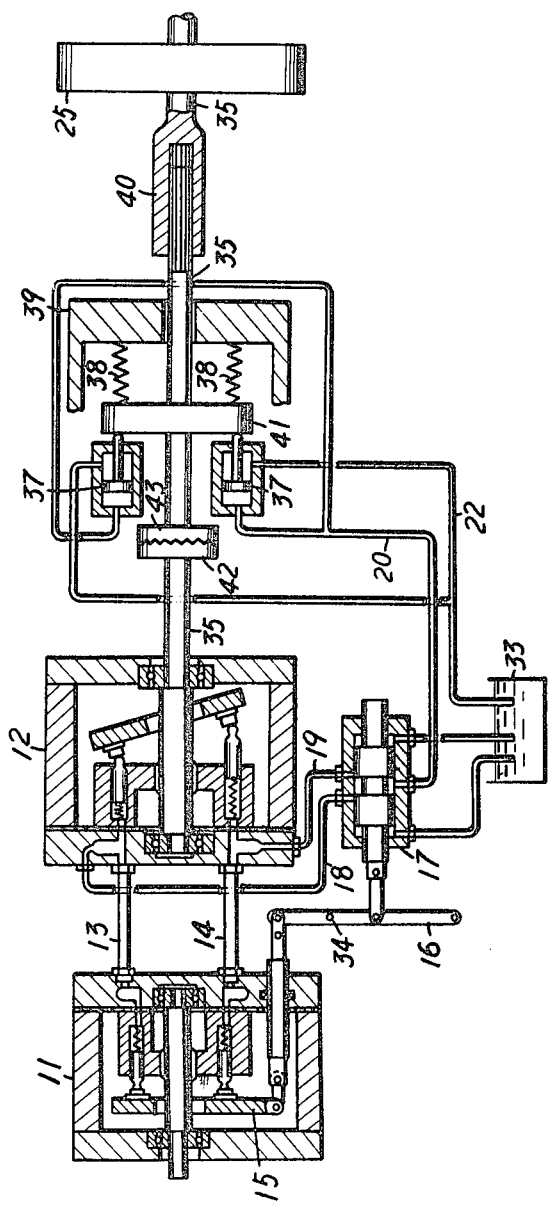

3,638,772

MEANS FOR PREVENTING REVERSE DRIVE THROUGH A HYDROSTATIC TRANSMISSION

This invention relates to a means for automatically preventing a motor, which is hydraulically driven by a pump and mechanically drives an inertial load, from pumping caused by being driven by the inertial load.

The pump and the motor in the hydraulic power transmission system are, in general, characterized in that it is possible to gradually vary the reduction gear ratio thereof, so that either the pump or the motor or both the pump and motor are of variable capacity. In such a hydraulic power transmission, when the load is rotated at a high speed, a large capacity of the pump and a small capacity of the motor are required, and, during at a low speed on the load side, a small capacity of the pump and a large capacity of the motor are required. Under these circumstances, when the speed of the motor is suddenly lowered, the hydraulic motor tends to be reversely driven by the inertial load so as to rotate the large capacity motor at a high speed as a pump, and tending to rotate the small capacity pump at a higher speed. In addition, for example, when a car driven by a hydraulic motor goes down a down grade in the state of a small capacity of the pump and a large capacity of the motor, the motor, and therefore, the pump also, are driven by the inertial load due to an external force, similarly to the above situation.

When the hydraulic pump is reversely driven up to an unusually high speed, it is inevitable that various significant troubles such as seizure at the sliding contact surface of the pump, a damage of the prime mover, and the like will occur and the durability of the hydraulic pump and the hydraulic motor is lowered due to amplification of the leakage loss of the hydraulic system resulted from an excessive flow rate and occurrence of the cavitation resulting from the lowered pressure and the excessively large flow rate on the low pressured side, and the like.

In addition, when a hydraulically driven car such as a fork lift truck running at a high speed is decelerated, a high pressure suddenly occurs at the output side of the motor as if an emergency brake acts, and therefore, is displaced by inertia. This is extraordinarily dangerous. Such and other many problems in the practical operation of such a car are as yet unsolved.

Briefly stated in accordance with one aspect of this invention, there is provided a means for automatically preventing a motor, which is hydraulically driven by a pump and mechanically drives an inertial load through a transmission shaft, from a pumping action of the motor caused by being driven by the inertial load, comprising blocking a reverse power transmission at the shaft. The blocking may be done by braking a brake disc fixed to the shaft or by declutching a pair of clutching members arranged across the shaft. The automatic actuation of the blocking action may be either mechanically or electromagnetically effected.

The principal object of this invention is to provide a means for preventing the hydraulic motor from pumping caused by being reversely driven by the inertial load, or at least minimizing such an action.

Another object of this invention is to provide a means for preventing the hydraulic power transmission system including the hydraulic motor, a hydraulic pump for driving the motor, and a prime mover for driving the pump, from any damage caused by the pumping action of the motor as above.

Still another object of this invention is to provide a means for preventing a car from being suddenly braked due to the pumping action as above. The invention will be better understood and other objects and additional advantages of the invention will become apparent upon perusal of the following description taken in connection with the drawings, in which:

FIG. 3 is another view still similar to FIG. 1, but showing the third embodiment in accordance with this invention; and FIG. 4 is still another view also similar to FIG. 1, but showing the fourth embodiment in accordance with this invention.

Similar numerals refer to similar parts throughout the several views.

Figure 1:
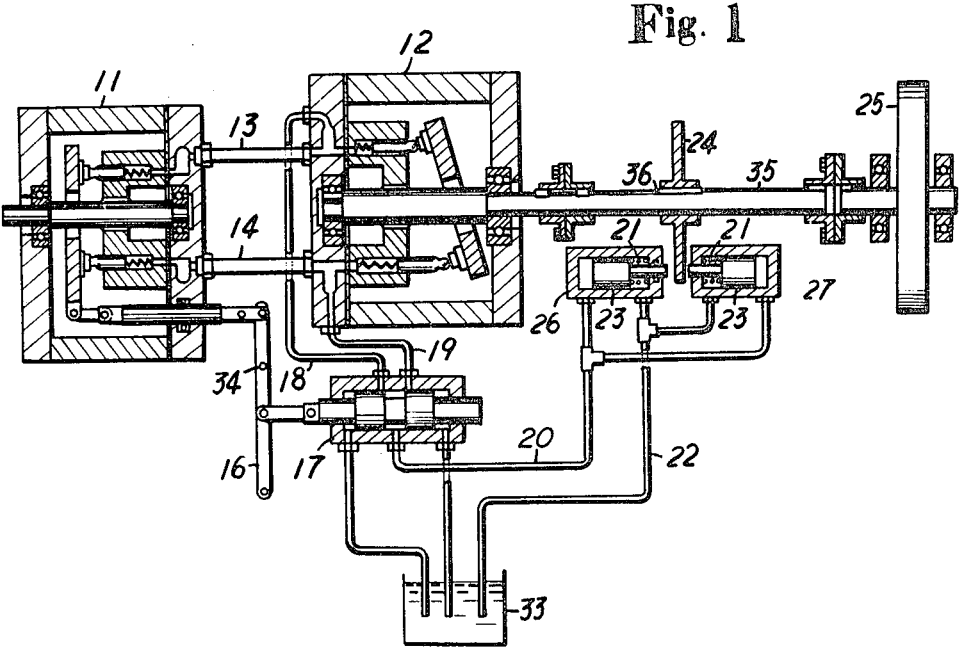
FIG. 1 is a schematical axially sectional view of an embodiment of a hydraulic power transmission system in accordance with this invention.

Referring more particularly to the drawings, the preferred embodiments of this invention will now be described; however, this description will be understood to be illustrative of the invention and not as limiting it to the particular methods and constructions as shown and described. There is a hydraulic power transmission system including a prime mover (not shown), a variable capacity plate axial plunger pump 11, a plate axial plunger motor 12, and an inertial load 25. The variable capacity plate axial plunger pump 11 is mechanically driven by the prime mover through a driving shaft. The plate axial plunger motor 12 is hydraulically driven by the plate axial plunger pump 11 through a pair of main conduits 13 and 14. The inertial load 25 is mechanically driven by the plate axial plunger motor 12 through a shaft 35. The plate axial plunger pump 11 comprises a swash plate 15 which is controlled by means of a controlling lever 16 swingably pivoted on a pivot 34 so as to incline the swash plate 15 in a well known manner.

EXAMPLE 1

Reference is now made to FIG. 1 illustrating the first embodiment of a hydraulic power transmission system in accordance with this invention, in which the shaft 35 is provided with a brake disc 24 arranged between a pair of hydraulic braking means 26 and 27, and fixed to the shaft 35 by means of a key 36. Each hydraulic braking means 26 and 27 comprises a piston 23 adapted to be axially slidable in a cylinder and loaded with a spring 21 pushing the piston 23 towards the working chamber of the cylinder.

The controlling lever 16 swingably pivoted on the pivot 34 is articulated also with a connecting rod for moving a spool contained inside a changeover valve 17 so that a pair of branched pipes 18 and 19 branched from the pair of main conduits 13 and 14, respectively, are changed over between two positions for communicating with a reservoir 33 and for communicating with the working chamber of the cylinders of the hydraulic braking means 26 and 27. The communication with the reservoir 33 as above serves for return and supply.

When the controlling lever 16 is inclined, the swash plate 15 is mechanically inclined thereby. The direction of rotation of the plate axial plunger motor 12 depends upon the direction of the inclination. Provided that the main conduit 13 is the higher pressured side and the main conduit 14 is the lower pressure side for the proper driving operation of the plate axial plunger motor 12, in the event of a reverse drive by the inertial load 25, the main conduit 14 becomes the higher pressure side and the main conduit 13 becomes the lower pressure side, although the direction of flow of the hydraulic medium is not changed.

In this embodiment, when the controlling lever 16 is not inclined, the plate axial plunger motor 12 is not actuated and, at the same time, the changeover valve 17 interrupts all communications through the branched pipes 18 and 19. When the controlling lever 16 is inclined, the spool of the changeover valve 17 is displaced for communicating either the branched pipe 18 or 19 with a brake actuating pipe 20 leading to the chamber behind the pistons 23 inside the cylinders of the braking means 26 and 27, and therefore, the hydraulic medium contained in the main conduit 13 or 14, of which a higher pressure is produced by virtue of the reverse driving from the inertial load 25, is supplied to the recesses so as to push the pistons 23 against the action of the springs 21 to push brake blocks fixed to the extremities of the piston rods of the pistons 23, respectively, against the brake disc 24 for decelerating the rotation of the shaft 35. When the high pressure is lowered to a given value, the brake blocks are disengaged from the brake disc 24 by virtue of the action of the springs 21 overcoming the hydraulic pressure subjected to the pistons 23, so as to release the shaft 35.

EXAMPLE 2

Figure 2:
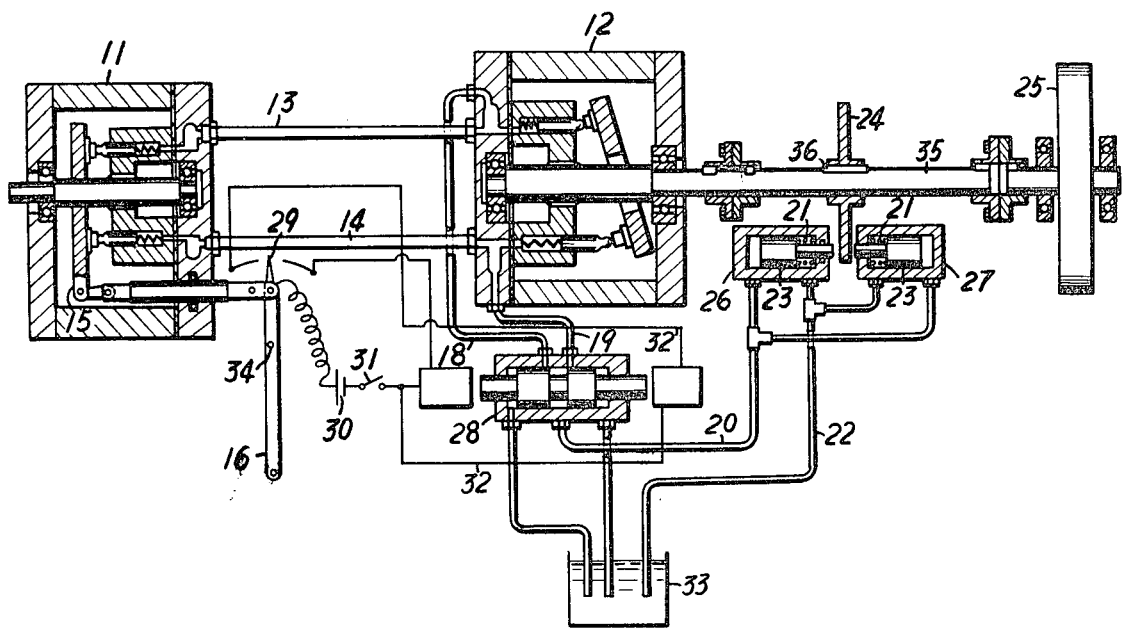
FIG. 2 is a view similar to FIG. 1, but showing the second embodiment in accordance with this invention.

Reference is now made to FIG. 2 illustrating the second embodiment of a hydraulic power transmission system in accordance with this invention, in which a changeover valve 28 corresponding to the changeover valve 17 shown in FIG. 1 is provided and operated electromagnetically instead of hydraulically. When the controlling lever 16 is operated, a switch 29 is adapted to be closed, so as to actuate the changeover valve 28, which is adapted to operate quite similarly to the preceding embodiment. A battery 30 and a main switch 31 are provided for completing the circuit for electromagnetically changing over the valve 28.

EXAMPLE 3

Reference is now made to FIG. 3 illustrating the third embodiment of a hydraulic power transmission system in accordance with this invention, in which the shaft 35 is provided with and interrupted twice by a clutch 42, 43 and a slide joint or spline joint 40 between the plate axial plunger motor 12 and the inertial load 25. The controlling lever 16 arranged similarly to the first embodiment shown in FIG. 1 is adapted to operate a changeover valve 17 which is adapted to supply the high-pressure hydraulic medium to chambers of cylinders behind pistons 37 contained therein. A disc 41 is fixed to the intermediate part of the shaft 35 and loaded by springs 38 for biasing the disc 41 towards the plate axial plunger motor 12. The springs 38 are anchored to a frame 39 of the hydraulic clutching means.

When the controlling lever 16 is inclined so as to operate the plate axial plunger motor 12, the changeover valve 17 is displaced so as to communicate either one of the main conduits 13 and 14 with the clutching means actuating pipe 20. When an excessively high pressure occurs, the pistons 37 are actuated by the high-pressured hydraulic medium admitted into the recesses behind the pistons 37 inside the cylinders, and pushed against the disc 41 against the action of the springs 38, and therefore, the intermediate part of the thrust shaft 35 is displaced towards the inertial load 25 by virtue of the slide joint 40, so that a driven disc 43 of a clutch is disengaged from a driving disc 42 thereof, to interrupt the reverse transmission of power from the inertial load 25 to the plate axial plunger motor 12. When the main conduit 13 or 14 is released from the excessively high pressure of the hydraulic medium, the driven disc 43 is again brought into engagement with the driving disc 42 of the clutching means by virtue of the slide joint 40 and the action of the spring 38 so as to restore the power transmission from the plate axial plunger motor 12 to the inertial load 25.

EXAMPLE 4

Reference is now made to FIG. 4 illustrating the fourth embodiment of a hydraulic power transmission system in accordance with this invention, in which the second embodiment and the third embodiment of this invention are combined with each other. That is, the fourth embodiment comprises the controlling means similar to that of the second embodiment and the clutching means similar to that of the third embodiment. More particularly, the controlling lever 16 cooperated with a switch 29 energizes the changeover valve 28 for communicating either one of the two main conduits 13 or 14 with the clutching means actuating pipe 20. The pistons 37 are operated by an excessively high pressure of the hydraulic medium in either the main conduits 13 or 14 for disengaging the driven disc 43 from the driving disc 42. When the excessively high pressure of the hydraulic medium in the main conduits 13 or 14 is restored, the driven disc 43 is again engaged with the driving disc 42 by virtue of the slide joint 40 and by the action of the springs 38 so as to transmit the power generated by the plate axial plunger motor 12 to the inertial load 25.

While particular embodiments of the invention have been illustrated and described, modifications thereof will readily occur to those skilled in the art. It should be understood therefore that the invention is not limited to the particular methods and constructions disclosed but that the appended claims are intended to cover all modifications which do not depart from the true spirit and scope of the invention. While a plate axial plunger pump and a plate axial plunger motor have been illustrated, any variable capacity hydraulic pump and/or any variable capacity hydraulic motor may be substituted therefor, respectively.

I claim:

1. A means for automatically preventing a motor, which is hydraulically driven by a pump and mechanically drives an inertial load through a transmission shaft, from pumping caused by being driven by said inertial load, comprising a blocking means for blocking a reverse power transmission from said inertial load to said motor through said shaft, at said shaft, said blocking means including a plurality of brake elements and a brake disc, said brake disc being fixed to said shaft and arranged between said brake elements, said brake elements being fixed to pistons inside cylinders, respectively, hydraulic means coacting with said pistons for automatically urging said pistons hydraulically against said brake disc with a hydraulic medium provided for the power transmission, when an excessively high pressure occurs in said medium as a result of said reverse power transmission from said inertial load to said motor, and a pair of main conduits for driving said motor by said pump, and a changeover valve means coacting with said cylinders and main conduits for automatically providing communication therebetween when said pump drives said motor.

2. The combination of claim 1 and wherein a mechanical means controls said changeover valve.

3. The combination of claim 1 and wherein an electromagnetic means control said changeover valve.

* * * * *